United States Patent
Kautsch et al.

(10) Patent No.: US 6,299,264 B1
(45) Date of Patent: *Oct. 9, 2001

(54) HEAT SHIELDED MID-ROLLER

(75) Inventors: Dewaine A. Kautsch; Sean C. McGinnis, both of DeKalb, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/238,957

(22) Filed: Jan. 27, 1999

(51) Int. Cl.[7] .................................................. B60B 17/00
(52) U.S. Cl. .......................... 305/137; 305/193; 301/6.91
(58) Field of Search ..................................... 305/100, 129, 305/130, 136, 137, 138, 195, 193, 194; 301/6.91; 188/264 W, 264 G

(56) References Cited

U.S. PATENT DOCUMENTS

| | | |
|---|---|---|
| Re. 34,909 | 4/1995 | Kindel et al. ........................ 305/24 |
| 1,318,188 | 10/1919 | Tritton . |
| 1,382,355 * | 6/1921 | Greiner ............................. 301/6.91 |
| 2,704,942 | 3/1955 | Koile . |
| 2,791,256 | 5/1957 | Sinclair . |
| 2,838,344 | 6/1958 | Eyb . |
| 2,984,524 | 5/1961 | Franzen . |
| 2,989,351 | 6/1961 | Deysher et al. . |
| 3,540,743 | 11/1970 | Ashton et al. ........................ 277/92 |
| 3,567,292 | 3/1971 | Amsden . |
| 3,606,497 | 9/1971 | Gilles . |
| 3,703,317 * | 11/1972 | Laun, III ........................ 188/264 G |
| 4,425,008 | 1/1984 | Weeks ................................. 305/24 |
| 4,538,860 | 9/1985 | Edwards et al. ..................... 305/56 |
| 4,739,852 * | 4/1988 | Stevens et al. ..................... 305/136 |
| 4,834,478 * | 5/1989 | Stevens et al. ..................... 305/138 |
| 4,836,318 * | 6/1989 | Tonsor et al. ...................... 305/138 |
| 4,838,373 * | 6/1989 | Price et al. ........................ 305/137 |
| 4,950,030 | 8/1990 | Kindel et al. ........................ 305/24 |
| 4,998,783 | 3/1991 | Erlemaier et al. ..................... 305/56 |
| 5,022,718 | 6/1991 | Dickevers ............................ 305/24 |
| 5,141,299 | 8/1992 | Korpi .................................. 305/56 |
| 5,431,375 | 7/1995 | Mitais et al. . |
| 5,433,515 | 7/1995 | Purcell et al. ........................ 305/25 |
| 5,507,370 * | 4/1996 | White et al. ...................... 188/264 G |
| 5,851,056 * | 12/1998 | Hyde ................................. 301/6.91 |
| 5,997,109 * | 12/1999 | Kawtsch ............................. 305/129 |
| 6,086,169 * | 7/2000 | Keehner ............................. 305/137 |

FOREIGN PATENT DOCUMENTS

| | | | |
|---|---|---|---|
| 2351804 * | 12/1977 | (FR) | ............................. 301/6.91 |
| 280920 * | 6/1928 | (GB) | ............................. 301/6.91 |
| 674516 | 10/1950 | (GB) . | |
| 663488 * | 12/1951 | (GB) | ............................. 301/6.91 |
| 1025014 | 1/1965 | (GB) . | |
| 1244388 | 1/1969 | (GB) . | |
| 2317671A | 8/1997 | (GB) . | |
| 355114670 | 9/1980 | (JP) . | |

OTHER PUBLICATIONS

Application # 09/196,044, filed Nov. 19, 1998 Midwheel Assembly for a Track–Type Tractor.
Application # 09/238,957, filed Jan. 27, 1999 Heat Shielded Mid–Roller.

* cited by examiner

Primary Examiner—Russell D. Stormer
Assistant Examiner—Long Bao Nguyen
(74) Attorney, Agent, or Firm—Jeff A. Greene

(57) ABSTRACT

Endless rubber track laying machines are provided with a pair of track laying assemblies positioned on opposite sides of the work machine. Each track laying assembly includes an endless rubber belt entrained around a drive wheel, an idler wheel, and a plurality of supporting mid-rollers. The present supporting mid-roller includes a heat shield that is positioned between individual roller segments and guide blocks positioned on the inner surface of the endless rubber belt. With the heat shield in this position, heat generated from the guide blocks contacting the individual roller segments is dissipated, thereby increasing the life of the individual mid-roller components.

18 Claims, 2 Drawing Sheets

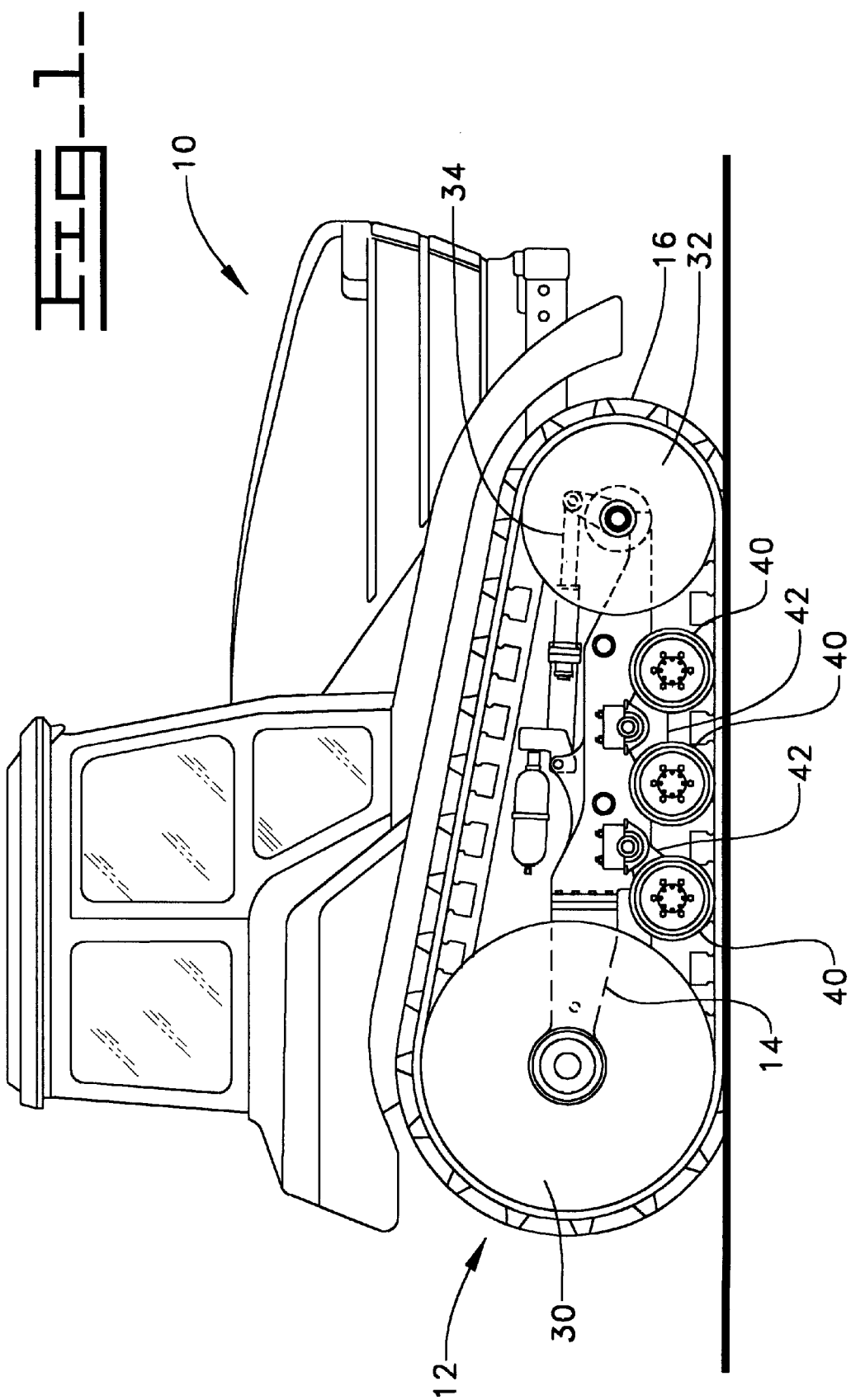

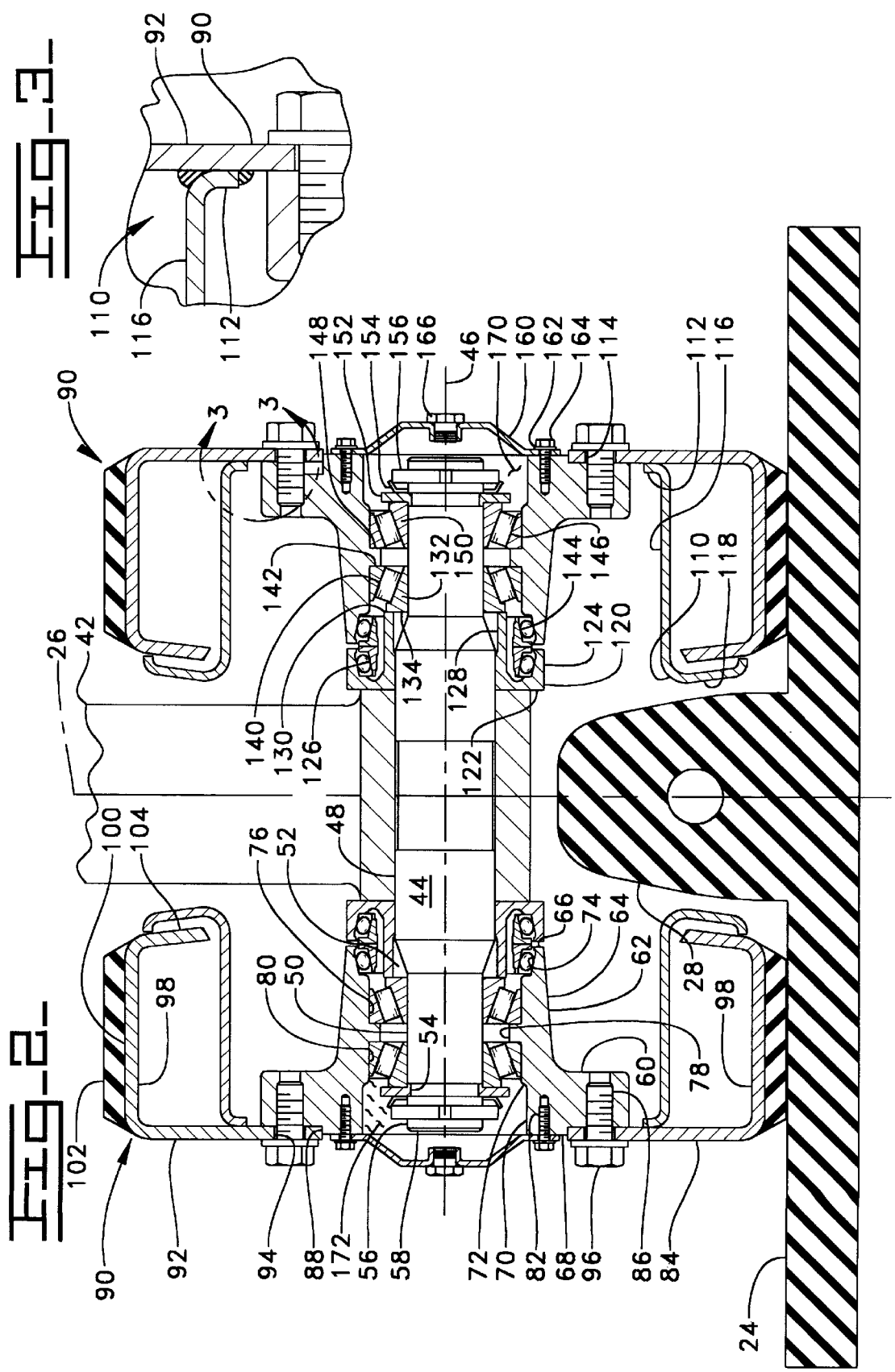

HEAT SHIELDED MID-ROLLER

TECHNICAL FIELD

This invention relates generally to a supporting mid-roller for the undercarriage of an endless track laying work machine and more particularly to a mid-roller having a heat shield positioned between the guide blocks of an endless track and an inner shoulder of the mid-roller.

BACKGROUND ART

Present day endless track laying work machines utilize a propulsion system in which a continuous flexible rubber belt is frictionally driven as it is entrained about a pair of wheels. Problems encountered in actually reducing such an endless track laying work machine to practice include how to maintain adequate tension on such belt around the entrained wheels, and keeping the belt in lateral alignment with the wheels when the wheels are subject to large lateral loads. Other problems are maintaining the structural integrity and providing long life for the belt, supporting mid-rollers, drive wheels, and idler wheels.

A common problem with endless track laying work machines utilizing continuous flexible rubber belts is heat. Heat is generated when the rubber belts come into contact with other drive components, such as the supporting mid-rollers, the drive wheel and the idler wheel. This is most prevalent with the supporting mid-rollers because of the speed at which they rotate in contrast to the drive and idler wheels, due to the supporting mid-roller generally being smaller in diameter.

The present invention is directed to overcome one or more of the problems as set forth above.

DISCLOSURE OF THE INVENTION

In one aspect of the invention a mid-roller is provided comprising a shaft defining an axis, and a pair of ends being spaced along the axis. A pair of roller segments are rotatably attached near each of the ends of the shaft and a pair of heat shields are positioned juxtaposed the roller segments.

In another aspect of the invention, a work machine is provided having a pair of track roller assemblies, one each is positioned on each side of the work machine. The track roller assemblies include a pair of endless belts defining an inner surface, an outer surface, a pair of edges, and a plurality of guide blocks. The pair of endless belts are driven by a drive wheel and an idler wheel. The pair of endless belts are tensioned between the drive wheel and the idler wheel by a tensioning system. The work machine comprises a plurality of supporting mid-rollers that are attached with said track roller frame and rotatably contact the inner surface of the pair of endless belts. The plurality of supporting mid-rollers include a shaft defining an axis. The shaft has a pair of ends that are spaced along the axis. The plurality of supporting mid-rollers include a pair of hubs. One hub is rotatably connected to the ends of the shaft. The plurality of supporting mid-rollers have a pair of individual roller segments, one each, fixedly attached to each hub. A heat shield is interposed each roller segment and the plurality of guide blocks.

BRIEF DESCRIPTION OF THE DRAWINGS

FIG. 1 is a side elevational view of a work machine embodying the present invention;

FIG. 2 is an enlarged sectional view of a mid-roller of the present invention; and FIG. 3 is an enlarged section view taken about 3—3 of FIG. 2.

BEST MODE FOR CARRYING OUT THE INVENTION

Referring to FIGS. 1 and 2, a work machine 10 is shown having a pair of track roller assemblies 12, only one shown, one positioned on each side of the work machine 10. Each track roller assembly 12 includes a roller frame 14 and utilizes an endless rubber belt 16. The endless rubber belt 16 defines an inner surface 20, a ground contacting or outer surface 22, and a pair of edges 24. Positioned on the inner surface 22 and centrally located on an elevational axis 26 between the pair of edges 24 is a plurality of guide blocks 28. Each endless rubber belt 16 is entrained around a drive wheel 30 and an idler wheel 32. In as much as the track roller assemblies 12 are substantially structurally and operatively similar, further reference will be made to only a single side of the work machine 10.

In this example, an engine (not shown) powers the drive wheel 30, in a conventional manner, and frictionally drives each of the endless rubber belts 16. Urging the idler wheel 32 away from the drive wheel 30, through the use of a tensioning system 34, tensions the endless rubber belt 16. The work machine 10, for example, is an agricultural tractor positioning the drive wheel 30 near the back and the idler wheel 32 toward the front of the work machine 10.

As further shown in FIG. 1 interposed the drive wheel 30 and the idler wheel 32 is a plurality of supporting mid-rollers 40. The mid-rollers 40 are attached to a suspension member 42, such as a bogie or trailing arm that is attached to the roller frame 14. As an alternative, the plurality of supporting mid-rollers 40 could be directly attached to the roller frame 14 as by fasteners.

Referring to FIG. 2, each mid-roller 40 includes a cylindrical shaft 44 defining an axis 46 and having a generally stepped configuration defining a first cylindrical surface 48 having a major diameter and a pre-established length. A pair of second cylindrical surfaces 50 axially extend from the first cylindrical surface 48 in opposite directions and have a pre-established length with a diameter being less than that of the major diameter. A pair of transition portions 52 are interposed the first cylindrical surface 48 and the pair of second cylindrical surfaces 50. An undercut 54 is interposed the second cylindrical surface 50 and a threaded portion 56 positioned at each of a pair of ends 58.

Assembled about the cylindrical shaft 44 is a pair of hubs 60 being symmetrical with the axis 46 of the cylindrical shaft 44. Each hub 60 includes a cylindrical housing 62 spaced from the axis 46 a predetermined distance and defining an outer surface 64. The cylindrical housing 62 defines a first end 66 positioned inwardly of the respective one of the pair of ends 58 of the shaft 42 and a second end 68 positioned outwardly of the same respective one of the pair of ends 58. The cylindrical housing 62 defines an inner cylindrical surface 70 being interposed the first end 66 and a second end 68. The inner cylindrical surface 70 includes a plurality of machined surfaces 72. For example, progressing from the first end 66 to the second end 68 is a sealing portion 74, a first bearing portion 76, a spacer portion 78 and a second bearing portion 80. The second end 68 of the cylindrical housing 62 has a plurality of threaded holes 82 positioned therein. Spaced inwardly and projecting radially outward from the second end 68 is a flange portion 84 having a plurality of threaded holes 86 positioned therein. Interposed the second end 68 and the flange portion 84 is a cylindrical surface 88 spaced from the axis 46 a predetermined distance.

In further reference to FIG. 2, positioned at the second end 68 of each cylindrical housing 62 is a pair of roller segments 90. Each roller segment 90 has a radial face 92 having a plurality of clearance holes 94 corresponding to the plurality of threaded holes 86 positioned in the radial extending flange portion 84 of the cylindrical housing 62. A plurality of threaded fasteners 96 connects the respective roller segments 90 to the pair of hubs 60. An outer cylindrical housing 98, being symmetrical with the axis 46, extends axially inwards towards axis 26 from the radial face 92 of the individual segment 90. The outer cylindrical housing 98 has an outer peripheral surface 100 having a predetermined length and being spaced from the axis 46 a predetermined distance. An elastomeric material 102, for example rubber, is bonded to the outer peripheral surface 100. Projecting inward, towards axis 46, from the outer cylindrical housing 98 is a shoulder 104 being spaced from axis 26 a predetermined distance. It should be recognized that the individual segments 90 could be manufactured as an integral part of each individual hub 60.

A pair of heat shields 110 is positioned interposed the hubs 60 and the individual shells 90. Each heat shield 110 has a flange portion 112 extending radially outward and having a plurality of clearance holes 114 corresponding to the clearance holes 92 in each individual roller segment 90. Extending axially inward, towards axis 26, from the flange portion 112 is a transition portion 116 being spaced from axis 46 a predetermined distance sufficient, so as not to interfere with the outer cylindrical housing 98 and the shoulder 104 of the individual shell 90. The heat shield 110 projects radially outward away from the transition portion 116 and forms a guide block contacting surface 118 juxtaposed to the shoulder 104 of each individual roller segment 90. The heat shield 110, is shown for example, as being manufactured from a continuous material, such as sheet steel. However, the transition portion 116 could have a plurality of holes placed therein so as to provide additional cooling capabilities. It should also be recognized that each heat shield 110 could be manufactured as being an integral part of the roller segment 90. It should also be understood that well known manufacturing processes include operations such as welding, casting, and machining.

As seen in FIG. 2, a pair of seal housings 120 each having an abutting surface 122 is positioned in abutting relationship with the suspension member 42. Each of the pair of seal housings 120 has a generally "J" configuration. The base of each of the pair of seal housings 120 is made up partially by the abutting surface 122 and a short leg 124 that extends axially from the abutting surface 122 a pre-established distance. The short leg 124 is of sufficient length so as to house a first sealing member 126 therein, which is for example a portion of a dual cone seal. A long leg 128 extends from the abutting surface 122 a pre-established distance being greater in length than that of the short leg 124 and is spaced from the short leg 124 a pre-established distance. Positioned at an opposite end of the abutting surface 122 on the long leg 128 is a bearing end 130. A pair of inner bearing races 132 are positioned about the second cylindrical surfaces 50 of the cylindrical shaft 44. Each of the pair of inner bearing races 132 has an end 134 in abutment with the corresponding bearing end 130 of the pair of seal housings 120.

Positioned in the first bearing portion 76 of the inner cylindrical surface 70 of the cylindrical housing 62 is an inner bearing and race assembly 140. An end 142 of the inner bearing and race assembly 140 is in abutment with the spacer portion 78. A second sealing member 144, being another portion of a dual cone seal is in sealing contact with the first sealing member 126, is positioned in the sealing portion 74 of the inner cylindrical surface 70 of the cylindrical housing 62. Positioned in the second bearing portion 80 of the inner cylindrical surface 70 of the cylindrical housing 62 is an outer bearing and race assembly 146. An end 148 of the outer bearing and race assembly 146 is in abutment with the spacer portion 78. And, a pair outer races 150 of the outer bearing and race assembly 146 is positioned about the shaft 44 and on the second cylindrical surfaces 50. A pair of washers 152 are positioned about the shaft 44 in abutment with the pair of outer races 150. The pair of washers 152 are also in abutting relation a lock 154 and a nut 156. The nut 156 is threadably connected to the threaded portion 56 of the shaft 44. The nut 156 abuttingly positions the lock 154, the washer 152, the outer races 150, the outer bearing and race assemblies 146, the inner bearing and race assemblies 140, the inner races 132, and the seal housings 120 into engagement with the suspension member 42. Additionally, the first seal member 126 and the second seal member 144 are positioned in sealing relationship. The relationship between the above components, the shaft 44 and the cylindrical housing 62 at each end 58 of the shaft 44 is symmetrical about axis 26.

Positioned at the second end 68 of the cylindrical housing 62 is a cap 160. The cap 160 has a plurality of clearance holes 162 corresponding to the plurality of threaded holes 82 positioned in the second end 68 of the inner cylindrical housing 62. A plurality of threaded fasteners 164 sealingly connect the respective cap 160 to the pair of hubs 60. A conventional plug 166 is positioned in each of the caps 160.

Each of the pair of hubs 60, the first and second seal members 126,144, the seal housings 120, the shaft 44, the cap 160 and the plug 166 have a cavity 170 formed therebetween in which a lubricant 172, such as oil is stored.

Industrial Applicability

As, the work machine 10 travels across different terrain it encounters irregularities such as furrows, hills and side slopes. Different loads are imputed into the endless rubber belts 16 as they rotate around the drive wheel 30, the idler wheel 32, and the supporting mid-rollers 40. For example, as the work machine 10 travels along a side slope the endless rubber belt 16 tends to shift to one side, causing the plurality of guide blocks 28 to make contact with the belt contacting surface 118 of the heat shield 110. The heat generated by this contact is carried away from the outer cylindrical housing 98 of the roller segment 90. By removing the heat from the outer cylindrical housing 98, the bond between the elastomeric material 102 and the outer peripheral surface 100 is preserved. Additionally, by providing the transition portion 116 of the heat shield 110 with a plurality of holes, additional cooling takes place reducing the amount of heat generally transmitted to the cylindrical housing 62, the inner and outer bearing and race assemblies 140,146, and the lubricant 172 is further reduced.

Thus, the heat shields 110 effectively and efficiently dissipates heat generated during operation. Furthermore, the heat shields 110 not only provides longer life for the supporting mid-rollers 40 but also dissipate heat that normally would be transferred to other associated drive train components, such as the endless rubber belts 16, the drive wheels 30 and the idler wheels 32.

What is claimed is:

1. A mid-roller comprising:
    a shaft;
    a pair of roller segments with a one of said pair of roller segments individually rotatably attached near each end of said shaft; and
    a pair of heat shields each having a guide block contacting portion being juxtaposed and spaced apart from said roller segments.

2. The mid-roller of claim 1 wherein said pair of heat shields are integral with said roller segments.

3. The mid-roller of claim 1 wherein said pair of heat shields are separate from said roller segments.

4. The mid-roller of claim 1 wherein said heat shield includes a flange portion and a transition portion, said transition portion further containing a plurality of holes.

5. The mid-roller of claim 1 wherein each of said pair of individual roller segments are individually rotatable about said shaft.

6. The mid-roller of claim 1 wherein said roller segment is attached to a hub, said hub being rotatably attached at each of said ends of said shaft, said hub defining a cavity containing a lubricant.

7. The mid-roller of claim 6 further comprising wherein said lubricant can be replaced.

8. The mid-roller of claim 7 wherein said lubricant is an oil.

9. The mid-roller of claim 8 wherein said lubricant is retained by a seal member.

10. The mid-roller of claim 9 wherein said seal member is a dual cone seal.

11. The mid-roller of claim 1 further comprising an elastomeric material attached to an outer peripheral surface of each of said pair of roller segments.

12. A track roller assembly having a track roller frame and an endless belt, said endless belt defining an inner surface and a plurality of guide blocks, and being driven by a drive wheel and an idler wheel, said endless belt being tensioned between said drive wheel and said idler wheel by a tensioning system, said track roller assembly comprising:

a plurality of supporting mid-rollers rotatably contacting the inner surface of said endless belt;

said plurality of supporting mid-rollers including a shaft defining an axis, a pair of ends being spaced along said axis;

said plurality of supporting mid-rollers including a pair of individual roller segments, one each being fixedly attached to said ends of said shaft; and a pair of heat shields being attached to the ends of said shaft, said heat shields separating each roller segment from the plurality of guide blocks.

13. The track roller assembly of claim 12 wherein said track roller assembly includes a roller frame and said pair of individual roller segments straddle said roller frame.

14. The track roller assembly of claim 12 wherein said plurality of supporting mid-rollers includes a pair of hubs defining a cavity in which a lubricant is positioned.

15. The track roller assembly of claim 14 wherein said lubricant is oil.

16. The track roller assembly of claim 14 wherein said cavity has an access thereto for replacing said lubricant.

17. The track roller assembly of claim 12 wherein said plurality supporting mid-rollers are removably attached to the roller frame by a plurality of fasteners.

18. The track roller assembly of claim 12 wherein said plurality of mid-rollers define an outer peripheral surface and an elastomeric material is attached to said outer peripheral surface.

* * * * *